United States Patent
Koehler et al.

(10) Patent No.: US 9,212,244 B2
(45) Date of Patent: Dec. 15, 2015

(54) POLYMERS MADE FROM MIXTURES COMPRISING VINYL ETHER MONOMERS

(75) Inventors: Matthias Koehler, Bad Schwalbach (DE); Volker Meyer, Riedstadt (DE); Edgar Boehm, Griesheim (DE); Michael Junge, Pfungstadt (DE); Eike Poetsch, Muehltal (DE)

(73) Assignee: MERCK PATENT GESELLSCHAFT MIT BESCHRANKTER HAFTUNG, Darmstadt (DE)

( * ) Notice: Subject to any disclaimer, the term of this patent is extended or adjusted under 35 U.S.C. 154(b) by 595 days.

(21) Appl. No.: 13/257,328

(22) PCT Filed: Feb. 25, 2010

(86) PCT No.: PCT/EP2010/001170
§ 371 (c)(1),
(2), (4) Date: Sep. 19, 2011

(87) PCT Pub. No.: WO2010/105730
PCT Pub. Date: Sep. 23, 2010

(65) Prior Publication Data
US 2012/0009393 A1    Jan. 12, 2012

(30) Foreign Application Priority Data
Mar. 20, 2009  (DE) .......................... 10 2009 013 710

(51) Int. Cl.
C08F 220/30    (2006.01)
C08F 220/28    (2006.01)
B32B 3/00      (2006.01)
C08F 216/14    (2006.01)

(52) U.S. Cl.
CPC ......... *C08F 220/28* (2013.01); *C08F 216/1416* (2013.01); *C08F 220/30* (2013.01); *C08F 216/14* (2013.01); *Y10T 428/24777* (2015.01); *Y10T 428/31855* (2015.04)

(58) Field of Classification Search
USPC .................................................. 524/548, 553
See application file for complete search history.

(56) References Cited

U.S. PATENT DOCUMENTS

| 5,403,512 | A  |   | 4/1995  | Bartmann et al.            |
|-----------|----|---|---------|----------------------------|
| 7,700,265 | B2 | * | 4/2010  | Hoshi et al. ....... 430/302|
| 7,807,236 | B2 |   | 10/2010 | Hirschmann et al.          |

(Continued)

FOREIGN PATENT DOCUMENTS

| DE | 10 2008 004 062 A1 | 8/2008 |
| JP | 2009/138116 A * | 6/2009 |

(Continued)

OTHER PUBLICATIONS

International Search Report, dated Apr. 28, 2010, issued in corresponding PCT/EP2010/001170. (Partial translation).
Japanese Office Action related to corresponding Japanese Application No. 2012-500101 dated Feb. 28, 2014.

*Primary Examiner* — Peter D Mulcahy
*Assistant Examiner* — Henry Hu
(74) *Attorney, Agent, or Firm* — John Sopp; Anthony Zelano; Brion Heaney

(57) ABSTRACT

The present invention relates to curable mixtures for the sealing, encapsulation, bonding or coating of opto-electronic components, such as OLEDs, solar cells, optical sensors and liquid-crystal displays, or for the alignment of liquid crystals. The mixtures comprise in total at least 50 percent by weight of vinyl ethers.

15 Claims, 1 Drawing Sheet

(56) References Cited

U.S. PATENT DOCUMENTS

| | | | |
|---|---|---|---|
| 7,887,716 B2 * | 2/2011 | Kong et al. | 252/182.23 |
| 7,902,305 B2 * | 3/2011 | Kong | 525/523 |
| 2006/0223978 A1 | 10/2006 | Kong | |
| 2007/0034515 A1 | 2/2007 | Kong et al. | |
| 2007/0065600 A1 | 3/2007 | Hammond-Smith | |
| 2008/0199635 A1 | 8/2008 | Hirschmann et al. | |
| 2008/0272328 A1 * | 11/2008 | Kong | 252/62.3 Q |
| 2008/0296159 A1 * | 12/2008 | Kong et al. | 204/600 |
| 2010/0164368 A1 | 7/2010 | Kong et al. | |

FOREIGN PATENT DOCUMENTS

| | | |
|---|---|---|
| JP | 2009138116 A | 6/2009 |
| WO | 92/21734 A1 | 12/1992 |
| WO | 2005/040307 A1 | 5/2005 |
| WO | 2006107803 A2 | 10/2006 |
| WO | 2007/111606 A1 | 10/2007 |
| WO | WO-2007/111606 A1 * | 10/2007 |

* cited by examiner

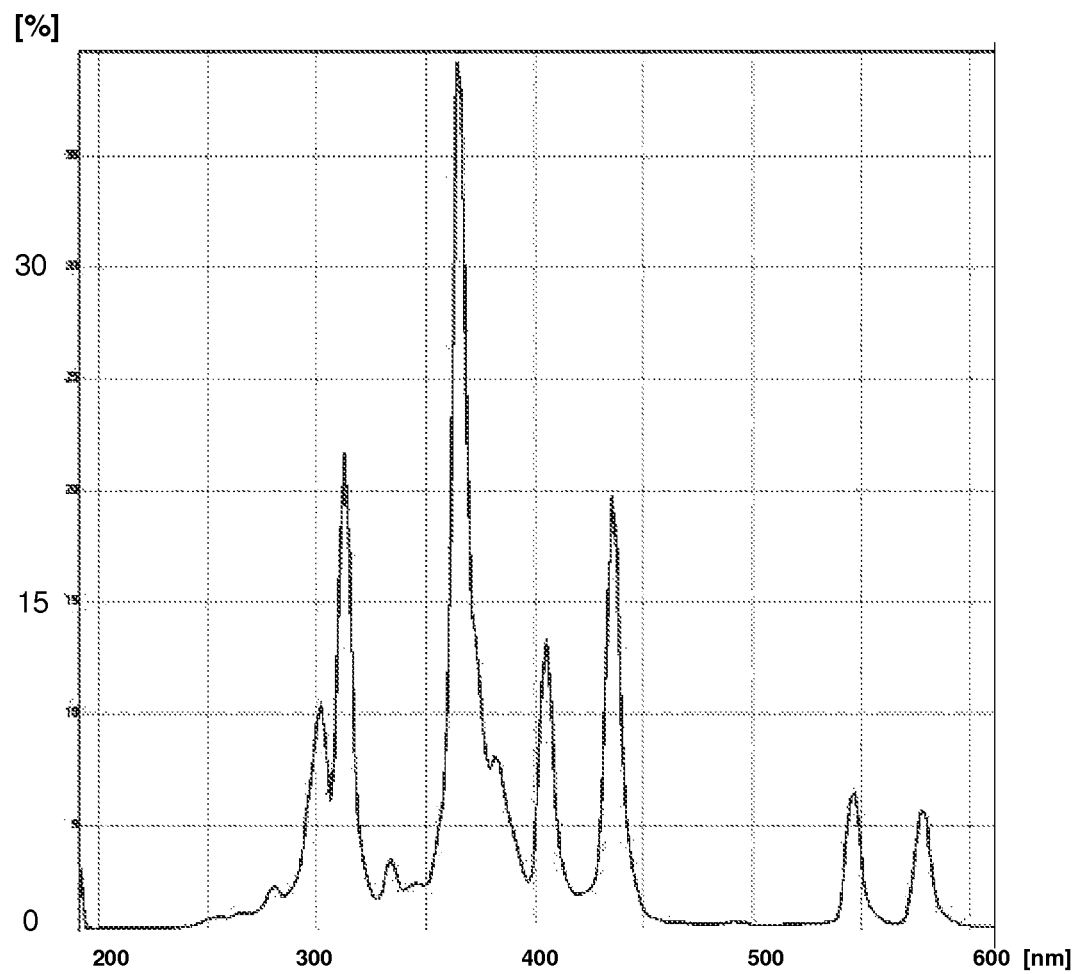

POLYMERS MADE FROM MIXTURES COMPRISING VINYL ETHER MONOMERS

The present invention relates to curable mixtures for the sealing, encapsulation, bonding or coating of opto-electronic components, such as OLEDs, solar cells, optical sensors and liquid-crystal displays, or for the alignment of liquid crystals. The mixtures comprise a high proportion of polymerisable vinyl ether monomers and further additives.

Novel display technologies, such as OLEDs (organic light-emitting diodes), offer many advantages compared with displays such as CRTs (cathode ray tubes) or LCDs. However, OLED technology also includes some challenges: the organic substances react very sensitively to moisture and oxygen. The same applies to similar applications, such as, for example, "electronic paper" or the use of OLEDs for lighting purposes. Effective protection of the active structure against moisture and oxygen is therefore crucial for the use of OLED displays in mobile telephones, MP3 players, etc. Novel display technologies, such as OLEDs, pave the way towards power-saving mobile telephone displays or increasingly TV screens. The component consists of a self-illuminating arrangement of semiconducting layers, similar to a classical LED, but the individual layers consist principally of organic substances. However, the extremely sensitive structure of the OLEDs must be protected against moisture, since it otherwise decomposes. The organic and metallic substances used react very sensitively to moisture and oxygen. This is due to the fact that both the luminescent polymers and also the cathode material—in many cases calcium or barium—are attacked and destroyed. For this reason, the component must be protected completely and durably against oxygen and moisture. The lifetime of an air-sensitive structure within a display device depends on the quality of the encapsulation, more precisely on the protection against the permeation of water and oxygen into the interior of the component.

For protection, it is, for example, encapsulated between two glass plates, i.e. the OLED layer structure is produced on a first substrate, and a cover glass (second substrate) is adhesively bonded to this substrate with the aid of an adhesive, which is applied along the edge of the OLED structure. This type of encapsulation is referred to below as "edge encapsulation".

In the case of edge encapsulation, the maximum permissible permeation depends, inter alia, on the size of the display, since the (OLED) surface area increases disproportionately quickly with increasing display size compared with the perimeter of the display, through which the moisture can ingress. The water permeation rate (or "water vapour transmission rate"=WVTR) is generally measured in $g/m^2*d$. It indicates how many grams of water pass through an adhesive layer having an area of 1 $m^2$ and a thickness of 1 mm in one day. For an edge-bonded OLED display, WVTR values of $10^{-1}$ to $10^{-2}$ $g/m^2*d$ are theoretically desirable. If the water uptake in the technical sense is based on the inner active OLED surface area, values of $10^{-6}$ to $10^{-7}$ are quoted for the WVTR. In general, getter parts, also known as desiccants, which rapidly bind ingressing water, are introduced into the interspace between the OLED structure and the edge-encapsulation cover.

Furthermore, the ingress of oxygen into the component is damaging. This phenomenon is characterised by means of the 'oxygen transmission rate'. In practice, this rate is not recorded separately. It is assumed that the ambient medium consists of air. In tests, the atmospheric humidity and the temperature are adjusted to values of increased load.

Alternatively, the adhesive can also be applied to the entire surface of the OLED substrate. This is known as "full-area encapsulation". In this case, the aim is to ensure that these materials do not attack and adversely affect the structures of the component, in particular the cathodes and the luminescent polymer, even before curing and also during curing.

Materials according to the invention which are introduced into a component, as in the case of full-area encapsulation, furthermore have the advantage that water- and oxygen-binding materials can also be integrated in this way and then render additional getter components in the interior of the component superfluous or augment their action.

Full-area encapsulation furthermore has the advantage that the substrate and cover, if bonded over the entire area, form a very strong mechanical unit and are superior to edge-encapsulated components of the same thickness with respect to the loads in daily use. In other words, much larger units can be achieved with full-area encapsulated components for a given permissible mechanical load. For example, it is only possible to produce components of limited size in the case of edge-encapsulated components. This is understandable if it is considered that, for example, a flexural load on the encapsulated component must only be absorbed in the sensitive edge region.

More recent OLEDs are designed with transparent cathodes in such a way that the light generated exits through the cathode (top emission). In this case, a gap between the substrate and the encapsulation cover is disadvantageous in the edge-encapsulation method. The demand for transparent materials for full-area encapsulation is thus underlined.

Combinations of edge encapsulation and full-area encapsulation are also useful. Edge encapsulation with the extremely narrow adhesive gap meets the requirements of a good diffusion barrier at the edge, and full-area encapsulation additionally protects the cathode in the interior and can also accommodate water- and oxygen-binding materials (getters). In such a case, the material of the full-area encapsulation is known as the filling material. The OLED is "filled". The substrate and cover are ideally totally hermetic, meaning that long-lasting attack through these surfaces cannot take place.

Besides low permeation, there is a second crucial parameter which must likewise be considered. Besides diffusion of the oxygen or water through the adhesive, it is also possible for diffusion to take place along the interface between the adhesive and the glass. This is less dependent on permeation through the adhesive, but is instead dependent on good adhesion due to physisorption or chemisorption of the adhesive or certain components of the adhesive to the glass. It is not only the initial strength that counts here, but instead and especially the long-term strength of the adhesive bond. Even after exposure of 500 h at 85° C./85% relative atmospheric humidity, for example, the adhesion must still be sufficiently high that diffusion does not take place at the interface between the glass and the adhesive.

The previous UV-curing products were not sufficiently up to the requirements of the lowest possible moisture permeability. Problems are also caused by shrinkage, for example of acrylates, during curing and the necessity to process the substances under inert gas in order to achieve the best-possible results. From this point of view, they are inferior to epoxides.

Barrier layers are also required for encapsulation in LCDs (liquid-crystal displays), where they both connect functional parts to one another in a stable manner and also fulfill other functions, such as, for example, diffusion barriers against air and moisture, transparency with defined optical properties. Especially in the vicinity of the liquid-crystalline mixtures, the compositions used must not release harmful constituents at any time, since the opto-electronic balance may be adversely affected. A special application is the ODF method (one-drop filling method), in which the contact area between the sealing material and the liquid-crystal mixture is relatively large. In addition, the sealing materials are generally not yet fully cured. In the case of processing before curing and also after polymerisation, the adhesives and sealing compositions are required to have particularly low solubility in the liquid crystals and also particularly low diffusion into the liquid crystals and conversely from the liquid crystals into the adhesives and sealing compositions. Otherwise, disadvantageous changes in the electro-optical behaviour may occur.

Besides acrylates, the sealing adhesive materials used to date principally comprise oxetanes (WO 2006/107803 A2) and epoxides as polymerisable groups. The specification WO 2007/111606 A1 describes various reactive monomers for use as adhesive barrier materials, including vinyl ethers. Up to 10% of the vinyl ethers were added to the bisglycidyl ether of bisphenol F without improved barrier properties being achieved compared with the pure glycidyl ethers.

Amongst the epoxides, particular mention may be made of the diglycidyl ethers of bisphenol A and of 1,4-butanediol, and cyclohexane epoxides. They are frequently polymerised together with polybasic amines. Both in the case of nucleophilic amine- or proton-induced curing and also in the case of cationic UV curing, oxetanes and epoxides form hydroxyl-containing products which are not inert to electrodes of (opto-)electronic components. The occurrence of telomers containing such groups is particularly disadvantageous. The cathode materials of OLEDs, for example, are considerably affected thereby. The conventional adhesives are therefore not sufficiently compatible with the surface of OLED components.

Polymerisable materials having liquid-crystalline properties have been proposed as barrier materials in the specification WO 2005/040307. For example, liquid-crystalline monomers containing acrylate groups are used. However, the acrylates are known for high shrinkage on polymerisation.

The adhesives are generally light- or UV-curing or thermally curing monomers which are cured by means of free radicals, cationically or nucleophilically, usually with addition of initiators and sensitisers. In the prior art, mixtures based on epoxides, which can be cured rapidly by UV light, have been used to date. A typical process sequence for encapsulation comprises the application of the adhesive to a first substrate, typically the later inside of the component, which already has functional structures for the component function. The adhesive is applied around the structures as "edge encapsulation" or over the entire surface as "full-area encapsulation". This can be carried out by needle dispensers, ink-jet printing or by screen printing. The second substrate is subsequently pressed on as cover, where the applied adhesive functions as contact surface and adhesion promoter between the two substrates. The two substrates then surround the component's functional elements lying in between and are permanently fixed in this position relative to one another by full curing of the adhesive. After seconds to minutes, the adhesive should be so strong that the component can be processed further.

It should be possible to influence the requirements of the processing properties of novel compositions according to the invention in a specific manner with respect to viscosity, thixotropy and substrate wettability, for example in the case of material application by printing.

In summary, the following properties are crucial for an efficient encapsulation composition for electronic components (for, for example, OLEDs or LCDs):

a low WVTR or OTR ('oxygen transmission rate') value for reduction of the transmission of water vapour and oxygen through the adhesive, very good adhesion of the adhesive to the glass and good long-term strength and moisture resistance of the adhesive bond for reduction of the transmission of water vapour and oxygen along the interface between the adhesive and the glass, and excellent suitability for fast, highly automated processes for mass production.

The adhesive composition should not emit any gases or residual substances before, during and after curing and should be completely inert to adjacent materials, in particular the cathode and the luminescent polymer. In this respect, it is desirable for the concentration of curing agents (initiators and sensitisers) which are not incorporated into the polymer and can diffuse out to be kept low.

The adhesive composition should be substantially dimensionally stable and volume-stable (no shrinkage) during and after curing.

The curing should advantageously result in complete success without the use of elevated temperatures (about <90° C.) and after a short exposure time.

The material should advantageously be transparent for use in the case of top and bottom emission and also for quality control in the laboratory and manufacturing.

The possibility of thermal post-polymerisation is advantageous under certain production conditions, since shaded areas are thus also curable. More design freedom thus also arises in the technical design of the components.

A further challenge is the increasing use of plastic substrates as an alternative to glass. Plastic substrates have a different surface nature and require adapted adhesive systems. They are more flexible than glass, enabling the production of flexible displays. For such applications, a relatively flexible adhesive with high adhesion which is not brittle is advantageous.

In accordance with the invention, novel materials have been found which are suitable for the requirements outlined above, both with respect to the properties of the monomeric composition and also of the polymeric composition obtained therefrom, as adhesive for use in display or lighting components.

These adhesive compositions are distinguished by the fact that, in contrast to many currently available products, they are very highly compatible with the functional materials used in displays. Their full functioning ability is generally achieved by light curing. This allows short process times in mass production and thus results in considerable cost savings. They have a high barrier action to water vapour. The compositions can be designed in such a way that they have high lipophilicity or hydrophobicity, which has proven advantageous for the barrier action. The materials described may be fluorinated, which supports the hydrophobic properties.

The invention is described in greater detail below. In one embodiment, it encompasses compositions which are suitable as adhesives in the broadest sense of this invention. The compositions according to the invention comprise one or more vinyl ether monomers, which contain one or more groups of the formula —O—CH=CH$_2$ and at least one carbocyclic group, and at least one further component selected from:

a) the vinyl ether compounds of the formula Ia (cf. below) or b) a lipophilic, non-polymerisable component comprising a polymeric hydrocarbon having molecular weights of 1000-10,000 and/or a compound of the formula Ib (cf. below), where the total content of vinyl ethers and fluorovinyl ethers together is at least 50% by weight.

According to an embodiment of the invention, the compositions according to the invention comprise one or more vinyl ether monomers of structure Ia, by means of which the properties of standard commercially available vinyl ethers (for example VEctomer™) are significantly improved. As further additives, getters and/or lipophilic microdomain-forming substances can be admixed. The addition of epoxides or glycidyl ether derivatives to the vinyl ether mixtures enables the production of adhesive compositions for consecutive curing which do not require OLED and LCD function-reducing addition of amines. The photoinitiators used are so-called cationic polymerisation initiators of the iodonium or sulfonium type. If acceptors containing electron-deficient double bonds, such as, for example, N-alkylmaleimides, are added to the vinyl ethers having donor properties in stoichiometric amounts, EDA (electron-donor-acceptor) systems, which polymerise on irradiation, even without photoinitiators, form in situ. This free-radical polymerisation can be accelerated by the addition of "free-radical" photoinitiators, such as acylphosphine oxides or so-called Irgacure™ products having a benzoyl structure. This novel copolymerisation with maleimides even proceeds without initiator with fluorine substitution of the vinyl ether group, so that quality reductions of the adhesive composition due to degradation products or residues of the initiator are avoided.

The vinyl ethers Ia according to the invention have the structure shown below:

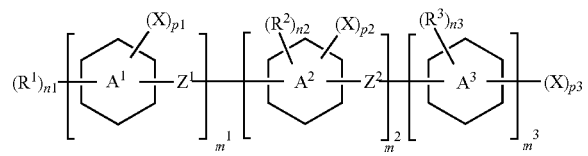

in which
m$^1$, m$^2$, m$^3$ denote 0, 1 or 2, where m$^1$+m$^2$+m$^3$=2 to 6;
R$^1$, R$^2$, R$^3$, independently of one another, denote H, a fluorinated or unsubstituted, straight-chain or branched alkyl radical having 1 to 15 C atoms, where, in addition, one or more non-terminal CH$_2$ groups in these radicals may each be replaced, independently of one another, by —CH=CH—, —(CO)—, —O— or —S— in such a way that O or S atoms are not linked directly to one another, F, Cl;
p1, p3, n1, n3 denote 0, 1, 2, 3, 4 or 5, where p1+n1=0 to 5 and p3+n3=0 to 5, preferably 0 or 2;
p2, n2 denote 0, 1, 2, 3 or 4, where p2+n2=0 to 4, preferably 0 or 2;
where p1+p2+p3≥1;
X denotes Q-O—CH=CH$_2$, Q-O—CH=CF$_2$ or Q-O—CF=CF$_2$, preferably -Q-O—CH=CH$_2$;
Q denotes a single bond or —CH$_2$— or a C$_2$-C$_{10}$ alkylene radical, in which one or more CH$_2$ groups in this alkylene radical may be replaced by —O— or —S— in such a way that no O atoms are adjacent, preferably a single bond or —CH$_2$—;
A$^1$, A$^2$, A$^3$ each, independently of one another, denote a 1,2-, 1,3- or 1,4-cyclohexylene group, a 1,2-, 1,3- or 1,4-cyclohexenylene group, a 1,2-, 1,3- or 1,4-phenylene group, in each of which 1-2 CH$_2$ may be replaced by O, or in each of which 1-2 =CH— may be replaced by =N—, or a spiro[3.3]heptane-2,6-diyl group, preferably a 1,4-cyclohexylene group or 1,4-phenylene group;
Z$^1$, Z$^2$ each, independently of one another, denote a single bond, —CH$_2$CH$_2$—, an alkylene group having 3 to 6 C atoms, —CF$_2$CF$_2$—, —CH$_2$O—, —CF$_2$O—, —OCH$_2$—, —OCF$_2$—, —C≡C—, preferably a single bond;
where, in the case where X represents a group of the formula —OCH=CH$_2$ and A$^1$, A$^2$ or A$^3$ is bonded to a phenylene group, the respective group A$^1$ in each case in the ortho position to X is not substituted by hydrogen. In this case, the benzene ring in the ortho position to X is preferably substituted by F, C$_{1-6}$ alkyl, C$_{1-6}$ alkoxy, X or an adjacent ring (A$^1$, A$^2$ or A$^3$ or Z$^1$, Z$^2$), preferably by F.

Preferred compounds of the formula Ia are selected from the following:

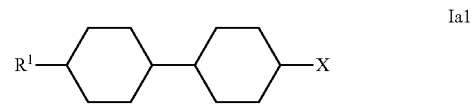

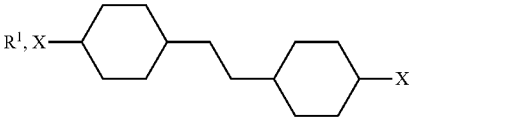

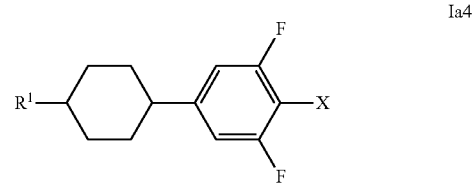

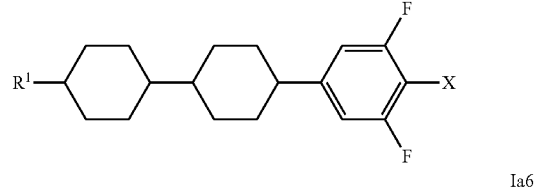

in which R$^1$ and X are as defined above.

The cyclohexane rings preferably have the trans configuration for Ia and the sub-formulae.

In addition, up to 20% by weight, preferably 0-10% by weight, of further vinyl ether components which do not fall under the categories mentioned above may be added. These are primarily chain-shaped compounds without ring systems. Suitable compounds are, for example, dodecyl vinyl ether (K), i.e. more generally the vinyl ethers of long-chain alcohols (C$_{14}$-C$_{22}$), furthermore the vinyloxyalkyl ethers (in particular 4-vinyloxybutyl) of simple dicarboxylic acids, such as glutaric acid or adipic acid.

The other vinyl ether compounds for the compositions according to the invention are selected from substances which have at least one carbocyclic ring, preferably including a cyclohexane ring, a benzene ring, or, more rarely, a naphthalene ring. These rings are preferably disubstituted, i.e. non-terminal. The compounds preferably contain 15-30 C atoms and, besides the vinyl ether group and the hydrocarbon structural parts, have only functions such as ethers or esters. The cyclohexane derivatives are particularly preferred, very particularly including the 1,4-substituted cyclohexane derivatives.

Suitable cyclohexane derivatives have the following formula:

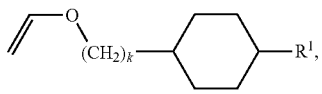

preferably

in which k denotes 0, 1 or more, preferably 1, and $R^1$ denotes a fluorinated or unsubstituted, straight-chain or branched alkyl radical having 1 to 15 C atoms, where, in addition, one or more non-terminal $CH_2$ groups in these radicals may each be replaced, independently of one another, by —CH=CH—, —(CO)—, —O(CO)—, —(CO)O— or —O— in such a way that 0 atoms are not linked directly to one another, and in which one terminal $CH_3$ group may be replaced by phenyl (optionally substituted by $CH_3$, Cl, F, $OCH_3$, —(CO)$CH_3$), in addition F or Cl.

Suitable examples of 1,4-substituted cyclohexane derivatives containing vinyl ether groups are the following known components:

1,4-cyclohexanedimethanol divinyl ether (C)

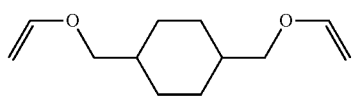

1,4-divinyloxycyclohexane

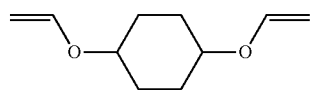

bis[4-[(vinyloxy)methyl]cyclohexylmethyl]glutarate C2
4-(vinyloxymethyl)cyclohexylmethyl benzoate (D)

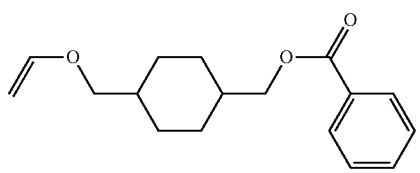

Further possible vinyl ether components are the following:
bis[4-(vinyloxy)butyl]isophthalate F
bis[[4-[(vinyloxy)methyl]cyclohexyl]methyl]isophthalate I
tris[4-(vinyloxy)butyl]trimellitate NQV
bis[[4-[(vinyloxy)methyl]cyclohexyl]methyl]terephthalate L Of the vinyl ether components mentioned above, components C, D, F, I and NQV are preferred, particularly C and D. Component D is particularly suitable as base material, i.e. in the range 30-95% by weight. If component D is used as a base material, it preferably represents 60 to 100% by weight of the vinyl ether components, particularly preferably 70-95% by weight.

The total content of vinyl ethers and fluorovinyl ethers together is up to about 100% by weight if <1% by weight of curing agent is employed. It is preferably more than 70% by weight and particularly preferably more than 80% by weight. The amount of vinyl ethers and fluorovinyl ethers is significantly less if copolymerisation with maleimides is desired (cf. below). In the absence of maleimides or other comonomers which polymerise under the conditions selected, the total content of vinyl ethers and fluorovinyl ethers is preferably more than 80% by weight, particularly preferably greater than 85% by weight.

Apart from polymeric hydrocarbons having average molecular weights between 1000-10,000, such as, for example, commercial polybutadiene or poly-α-pinene, hydrocarbons such as, for example, squalene can also be added for the formation of barrier-forming microphases.

The addition according to the invention of cyclic hydrocarbons of the general formula Ib

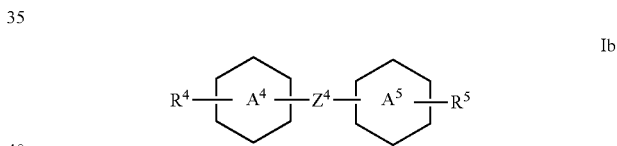

in which $R^4$, $R^5$, independently of one another, denote a $C_1$-$C_{10}$ alkyl, in which one or more $CH_2$ groups may be replaced by the group —CH=CH— or H may be replaced by F, $A^4$, $A^5$ denote a 1,2-, 1,3- or 1,4-cyclohexylene group, a 1,2-, 1,3- or 1,4-cyclohexenylene group or a 1,2-, 1,3- or 1,4-phenylene group, and $Z^4$ denotes a single bond, (—$CH_2$—)$_r$, —CH=CH—, —$CF_2$—$CF_2$—, —C≡C—, —$OCF_2$— or —$CF_2$O—, where r=1-6, has also proven particularly successful.

In Ib, preferably, independently of one another:

$A^4$, $A^5$, independently of one another, denote a 1,4-cyclohexylene group or a 1,4-phenylene group, $R^4$, $R^5$, independently of one another, denote a $C_1$-$C_{10}$ alkyl or $C_2$-$C_{10}$ alkenyl, and $Z^4$ denotes a single bond or —$CH_2CH_2$—.

The compounds of the formula Ib are added in amounts of up to 25% by weight, preferably in amounts of up to 15% by weight. The addition of these hydrocarbons Ib to the vinyl ether mixtures in proportions of up to 25% enables adhesives to be obtained in which the proportion of the compounds Ia can be reduced to 0%. The hydrocarbons are non-polar and therefore have a water-repellent action. They do not copolymerise with the vinyl ethers and form extremely finely divided droplets, which act as diffusion barrier.

The total amount of the compounds of the formulae Ia and Ib preferably varies between 3 and 25% by weight. A total content of 5 to 15% by weight is particularly preferred.

For protection against the ingress of water and oxygen, microphases having dimensions below 200 nm, which are of a crystalline, amorphous, inorganic or organic nature, are frequently introduced into the polymer. If these microphases act via physisorption (for example zeolite, Aerosils) or chemisorption (for example CaO, BaO), they are known as getters, and act as relative diffusion barrier against the base polymer, and are thus known as barriers (for example polybutadiene, poly-alpha-pinene, $SiO_2$-monodisperse spheres). Lipophilic monomeric hydrocarbons, such as squalene, or bicyclic to tricyclic liquid crystals containing alkyl or alkylene substituents are also suitable for the formation of barrier-forming microphases by separation of the adhesive composition during the polymerisation and formation of microphases.

In order to minimise harmful diffusion processes of, for example, water by strong adhesion of the adhesive material at the glass interface, co-reactive alkoxysilanes can be added in an amount in the region of ≈5%. These adhere to the glass surface, ideally by chemisorption, triggered by reaction of the alkoxysilane group with the Si—OH groups of the glass surface with alcohol formation and link the glass surface to the adhesive material via the second reactive group, which copolymerises with the monomers of the adhesive composition. A co-reactive example of epoxy adhesives which may be mentioned is glycidoxypropyltrimethoxysilane.

Epoxides, in particular, are of interest as further additives. Dilution with harmless vinyl ethers also makes epoxide-containing mixtures relatively compatible with OLED cathodes. The epoxides as additive impart improved toughness of the cured material and open up the possibility of consecutive curing (cf. below), since they have a different polymerisation behaviour to the vinyl ethers. In an embodiment of the invention, compositions are therefore disclosed which comprise more than 30% by weight, preferably more than 40% by weight, of vinyl ethers (end group —O—CH=$CH_2$) and between 20 and 55% by weight of epoxides. The weight ratio of epoxide to vinyl ethers should not be greater than 1.5. The weight ratio is preferably between 0.5 and 1.2. The total content of vinyl ethers and fluorovinyl ethers together in this embodiment is particularly preferably greater than 50% by weight. The preferred polymerisation initiator corresponds to the other embodiments.

In a preferred embodiment, the compositions according to the invention comprise no acrylate monomers. The materials obtained in this way generally exhibit little shrinkage on curing. For other technical reasons, a proportion of acrylates may nevertheless be advantageous. These advantages should be weighed up depending on the application.

The adhesive is generally exposed using UV light through the substrate glass and cured. After seconds or minutes, the adhesive is so strong that the OLED structure can be processed further.

Consecutive Curing

If a composition is polymerised in a plurality of process steps, the polymerisation is in the simplest case divided into a pre-polymerisation and a post-polymerisation (consecutive curing).

A procedure of this type opens up the possibility of giving the liquid or viscous composition such an increased viscosity by the pre-polymerisation that it remains at the site of application and retains its shape. At this stage, the adhesive property is still very high, meaning that bonding of components is still possible. Only after the combination of all components in the vicinity of the applied composition is a durable bond in the form of a solid polymer produced in a post-polymerisation.

The coating of both substrate surfaces may also be advantageous, especially in the case of consecutive curings, since the non-polar monomer components preferably diffuse towards the side of the gas phase, while the relatively polar constituents are physisorbed or chemisorbed on the polar substrates, meaning that the latter achieve better adhesion to the substrate side than in the case of single coating.

Further process steps, such as, for example, application of substances in the vicinity of the composition, printing-on of (semi)conductors, filters, etc., or application of a cover substrate, can be carried out between the pre- and post-polymerisation. Preferably, after a pre-polymerisation of the applied composition on a first surface of a substrate of a liquid-crystal display device, a liquid-crystalline mixture is applied to this first surface in a subsequent step. The device is subsequently sealed by application of a second, opposite substrate and solidified by post-polymerisation. The composition here can serve as adhesive between the substrates. At the same time, the composition can also serve for the generation of separating lines or for the definition of discrete regions (for example pixels) of the display device. In the latter case, the composition is deposited and pre-cured in the form of three-dimensional structures, preferably by printing techniques. In an embodiment of the invention, a liquid-crystalline mixture is introduced into these structures in the form of small droplets. This technique is basically familiar to the person skilled in the art in the area of liquid-crystalline displays as 'one-drop filling' (ODF).

In the broadest sense, consecutive curing can also advantageously be employed if not all areas of the component to be bonded are accessible to the curing UV radiation. For example, a cathode is a layer which shades the underlying layers and thus adversely affects the UV curing. In such cases, an additional thermal polymerisation, in which the shadow areas of the component due to the manufacturing process can be post-polymerised, is advantageous.

The principles of consecutive curing may be:
1) Different curing principles, for example radiation curing and thermal curing or vice versa, in separate process steps
2) Different materials with different reaction times, for example with short reaction times for the radiation curing of vinyl ethers and with significantly longer reaction times for the radiation curing of epoxides
3) Light-curing materials/mixtures having different sensitivities with respect to the wavelength.

Compositions for Consecutive Curing

In a preferred embodiment of the invention, the composition according to claim 1 comprises two different curable systems, a thermal system and a photochemical system, or two photochemical systems based on light of different wavelength. Different monomers may be present in each case, matching these systems. The composition here preferably comprises vinyl ethers and epoxides, particularly diglycidyl ethers (bisepoxides, cf. example part). Corresponding different curing agents may be present. The composition is therefore preferably subjected to a thermal curing step in addition to the photocuring. The composition furthermore comprises a vinyl ether component, which may be photochemically polymerised. The compositions thus comprise a lower content of diglycidyl ethers than conventional adhesive systems based on at least 90% of these epoxide compounds. The lower content of epoxides means that the polymer contains fewer terminal hydroxyl groups. In addition, the lipophilicity and steam impermeability may be significantly increased by the vinyl ethers. Finally, the system allows controllable two-stage curing (consecutive curing).

Use for PS-VA

The 'polymer stabilised vertical alignment' (PS-VA) method uses the adhesion function of polymerisable materials for vertical alignment of liquid-crystalline materials (LC materials) having negative dielectric anisotropy (cf. the specifications JP 10-036847 A, EP 1 170 626 A2, EP 1 378 557 A1, EP 1 498 468 A1, US 2004/0191428 A1, US 2006/0066793 A1 and US 2006/0103804 A1). The VA-LC materials are generally subjected to vertical pre-alignment (VA). For polymer-stabilised pre-alignment (PS-VA), a corresponding LC mixture is mixed with the monomer components of the adhesive and vertically aligned between the already bonded or unbonded electrodes of the LC display at a voltage of 20 to 50 V. During the alignment, the mixture is irradiated, with the photopolymerisable monomers forming vertical polymer columns due to separation during the polymerisation, with these columns maintaining the vertical alignment even at low voltages.

In an embodiment of the invention, the compositions are therefore used as additive for polymer-stabilised liquid-crystal compositions. The end product therefore encompasses the use of the composition as alignment polymer in a PS-VA display device. The amount of added vinyl ether polymers is preferably 0.3 to 3% by weight, with 20% by weight contents of polymerisable LC monomers (vinyl ethers, epoxide derivatives) being preferred.

Polymerisation Initiator

The polymerisation of the compositions is preferably carried out in the presence of a cationic polymerisation initiator. Such initiator systems are known and comprise, for example, triarylsulfonium salts or diaryliodonium salts. Triarylsulfonium salts are particularly preferred. The catalyst of the form $[Ph_2S^+-Ph-S-Ph-S^+Ph_2][SbF_6^-]_2$ mentioned in the example part is very particularly preferred. A counterion which is likewise suitable is the hexafluorophosphate anion instead of the antimonate.

The said substances are known to the person skilled in the art in various specific forms (cf. examples) and are commercially available. In order to improve the initiator, a sensitiser may also be added. The initiation is preferably carried out using one type of light, particularly UV. The photoinitiator system used is generally adapted in such a way that it has an activity in a spectrum of the light which is not fully absorbed by the co-components of the composition or by the display cover glass used.

The composition may also comprise thermal polymerisation initiators, such as, for example, acidic initiators. Such additives are familiar to the person skilled in the art. In general, thermal loading of electronic components is avoided. Nevertheless, the use of thermal initiators besides photoinitiators enables particular requirements of the polymerisation rate to be met. For example, a combination of various types of initiator enables multistage curing of the composition to be achieved (consecutive curing). This sequence is controlled by the use of heat and light in separate process steps.

However, the photochemical in-situ generation of protons from the above-mentioned cationic photoinitiators is preferred in the combined photochemical/thermal consecutive curing in the first step before the thermal curing. The protons formed protonate the β-carbon atom of the vinyl ether group with formation of a carbocation on the carbon in the α-position. This alkylates a further vinyl ether molecule in the β-position, again with formation of an α-carbocation. Through repetition of this step, a polymer forms which is surrounded by further monomers and thermally active intermediates in the initial phase of the polymerisation. These intermediates are presumably remaining carbocations or π-electron complexes of the vinyl ethers or sigma-proton adducts of the epoxides, i.e. onium cations thereof, which are converted thermally into carbocations and then react with the remaining monomers.

A further possibility for the two-step polymerisation is initiator systems consisting of two or more photoinitiators which function in a wavelength-dependent manner. Polymerisation steps separated in time can also be achieved in this way.

Copolymers with Maleimides

In accordance with a further embodiment of the invention, the compositions additionally comprise one or more maleimide compounds (cf. definition of terms below). The preferred derivatives are the N-substituted derivatives, preferably including the N-alkylmaleimides. The maleimides are preferably employed in a stoichiometric amount, i.e. up to 50 mol %, with respect to the amount of vinyl ether compounds in the composition. In general, a copolymer forms with the vinyl ethers during curing. In this embodiment of the invention, the cationic polymerisation initiator is generally omitted. A cationic initiator of this type can advantageously be added if the molar proportion of vinyl ethers predominates over the maleimides. The copolymerisation of the vinyl ethers with the maleimides can be further accelerated by free-radical initiators.

The vinyl ether components employed in this embodiment of the invention are preferably the following compounds:

1,4-cyclohexanedimethanol divinyl ether (C)

4-(vinyloxymethyl)cyclohexylmethyl benzoate (D)

tris[4-(vinyloxy)butyl]trimellitate (NQV)

NQV together with the compounds of the structural formula Ia, for example bicyclohexyl compounds of the formula Ia, such as, for example,

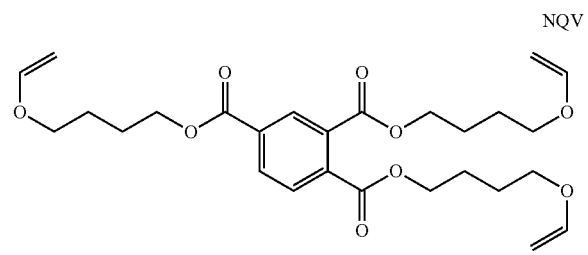 [SMILES: C=COCCCCOC(=O)c1ccc(C(=O)OCCCCOC=C)c(C(=O)OCCCCOC=C)c1]

CC-5-1OV

CC-3-OXF

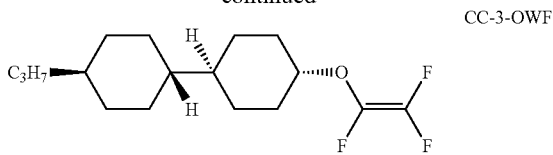

CC-3-OWF

Very particular preference is given to a combination of a plurality of these compounds, in particular a combination of at least components D and C. The ratio of C and D can be varied depending on the desired hardness of the cured composition. A molar ratio of D to C in the range 70-99 mol % is preferred. The final hardness increases with increasing proportion of C compared with D. By contrast, an increased proportion of D enhances the adhesive property. In this embodiment, the composition also comprises a stoichiometrically defined proportion of the compounds of the formula Ia, preferably selected from the compounds of the formulae

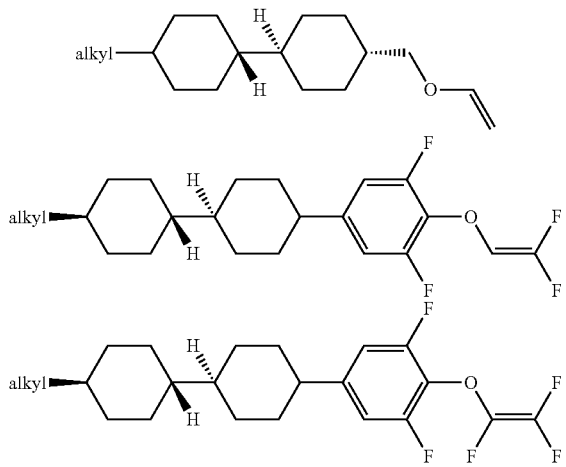

in which alkyl has 1-6 C atoms and preferably denotes ethyl, n-propyl or n-pentyl.

The proportion of the compounds of the formula Ia or of the sub-formulae is preferably 3 to 30 mol %, based on the total content of vinyl ether compounds.

The preferred proportion of the maleimides used is up to 50 mol %, based on the vinyl ether components.

If maleimides are used as co-component, it is also possible for fluorinated vinyl ethers to be copolymerised. The fluorinated vinyl ethers contain, for example, an end group of the formula —O—CH=CF$_2$, such as, for example, CCU-3-OXF, or —O—CF=CF$_2$, such as, for example, CCU-5-OWF.

The compositions which comprise maleimides can generally be cured photochemically without addition of initiators. The polymers therefore naturally do not release any by-products triggered by residues of the initiator. This increases the lifetime of sensitive bonded components. For UV curing, for example, the radiation of an Fe-doped Hg medium-pressure lamp can be used (see annex, drawing 1).

Preparation of the Vinyl Ether Compounds Ia

A number of synthetic routes to vinyl ethers, in particular of the structure Ia, are described in principle in the specification DE 19959721 A1.

Reference is made to the methods indicated below owing to their simple provision of vinyl ethers.

Transvinylation of alcohols and phenols by means of (Ir(cod)Cl)$_2$ as catalyst and vinyl acetate (Y. Ishii et al., Org. Synth., 2005, 82, p. 55 and J. Am. Chem. Soc., 2002, 124, p. 1590).

Suzuki coupling for the synthesis of aromatically substituted trifluorovinyl ethers (and thermal dimerisation or chain polymerisation thereof) (D. W. Smith, Jr. et al., Polymer Preprints, 2004, 45, p. 91).

Alkoxyvinyl ethers by alkylation of phenols/alcohols using haloalkyl vinyl ethers represents a proven and convergent synthesis principle (J. V. Crivello et al., J. Polym. Science: Polymer Chem. Edition, 1983, 21, p. 1785).

The preparation of the fluorinated vinyl ethers containing the end groups —OCH=CF$_2$ and —OCF=CF$_2$ is described in the specifications DE 19647991, DE102008004062, DE 09650634 and DE 4217248.

Devices, Use and Processes

The invention accordingly relates to an opto-electronic device which is sealed, encapsulated or coated at the edge or over the entire area with a composition according to the invention. This device is preferably a display device, for example an LCD or an OLED display. Particular preference is given to displays having a water- or oxygen-sensitive component.

The invention is particularly suitable for devices in which two adjacent layers of the structure are bonded to one another over the entire area by means of the composition. Over the entire area may also include the adhesive being applied in the form of a grid and distributed over the surface in a localised manner in grids, lines or points.

The invention furthermore relates to a process for the production of an opto-electronic device consisting of a plurality of layers, where these layers include a two-dimensional substrate and a (preferably transparent) cover layer, comprising the process steps of i) application of a composition to the substrate and/or the cover layer, where the composition is defined in accordance with one or more of claims 1 to 9, ii) joining of the two-dimensional substrate and the (transparent) cover layer in such a way that the composition comes to be located in between, and iii) full curing of the composition.

In a variant, step i) already includes a first curing (pre-curing), preferably by irradiation with (UV) light, after the application. In step iii), the curing initiated under i) is then continued, preferably by warming or re-irradiation, in particular by warming.

The irradiation of the composition is preferably carried out through the transparent cover layer of the device.

DEFINITION OF TERMS

Vinyl ether monomers are organic compounds which contain at least one group of the formula —O—CH=CH$_2$. Such compounds preferably contain 1, 2 or 3, more rarely 4, of such vinyl ether groups.

Getters in the sense of the present invention are substances which adsorb or chemically bind water or oxygen. Water- and oxygen-binding materials of this type may be chemically binding, such as, for example, CaO, or also physically binding, such as zeolites, Aerosil or SiO$_2$ particles. The size should be at most 200 nm owing to the optical properties if the material is used in the transparent part of a display device. In the case of larger particle sizes, a composition haze, whose properties are not advantageous, arises due to the particles.

Epoxides in the sense of the present invention are polymerisable compounds containing one or more oxirane rings. The oxirane rings are preferably bonded via a methyleneoxy group, i.e. so-called glycidyl ethers. Particular preference is given to bisglycidyl ethers. Known examples are the bisglycidyl ethers of bisphenol A (BADGE) and of bisphenol F (BFDGE),

BFDGE

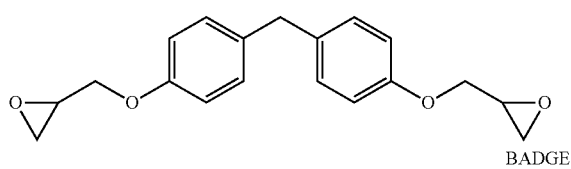

BADGE

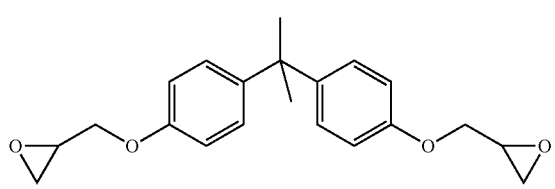

or 1,4-butanediol diglycidyl ether.

A further class of epoxides are the 3,4-epoxycyclohexyl compounds. Both classes of epoxides are employed industrially and are commercially available in many variations.

Fillers in the sense of the present invention are solids which are insoluble in the composition. They frequently consist of inorganic substances and also include some of the so-called getter materials.

The data in percent by weight (% by weight) above and below do not include the proportion of any filler present which is present in the composition as a solid (for example 5 parts of composition+1 part of filler consisting of, for example, inorganic solids, such as silicon dioxide variants). The data in percent by weight therefore relate in the narrower sense to the organic phase of the compositions.

Maleimide compounds in the sense of this invention are maleimide (also known as pyrrole-2,5-dione or maleimide) and derivatives thereof. N-alkylmaleimides (maleimides) are compounds of the formula III

III

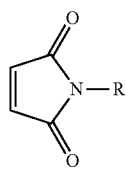

in which R denotes a $C_1$-$C_{10}$-alkyl group. R is preferably a lower alkyl group having 1 to 6 C atoms.

BRIEF DESCRIPTION OF THE DRAWING

FIG. 1: Emission spectrum of an Fe-doped Hg medium-pressure lamp. The FIGURE shows the spectrum of the UV lamp used. The wavelength is plotted in a linear manner from 200 to 600 nm on the horizontal axis, and the relative spectral intensity in % (0-40%) is plotted on the vertical axis.

EXAMPLES

Vinyl Ethers Used 1,4-Cyclohexanedimethanol divinyl ether C 4-(Vinyloxymethyl)cyclohexylmethyl benzoate (Vectomer 3040™) D (Source: Aldrich No. 49,645-6)

Bis[4-(vinyloxy)butyl]isophthalate (Vectomer 4010™) F

Bis[[4-[(vinyloxy)methyl]cyclohexyl]methyl]isophthalate (Vectomer 4040™) I

Dodecyl vinyl ether K

Tris[4-(vinyloxy)butyl]trimellitate (Vectomer 5015™) NQV

Vinyl ethers which fall under formula Ia:

CC-5-1OV

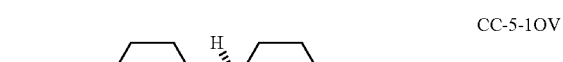

CC-3-OXF

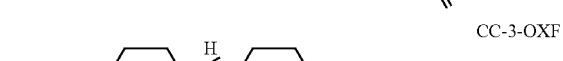

CC-5-OXF

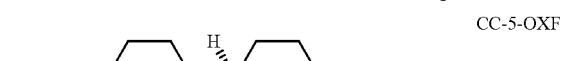

spirovinyl ether

CCU-3-OXF

CCU-5-OXF

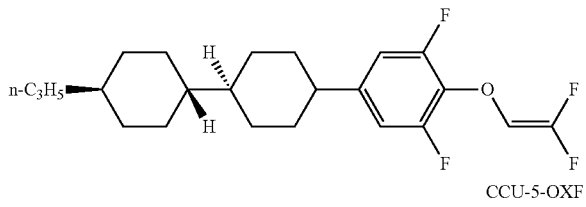

CCU-2-OWF

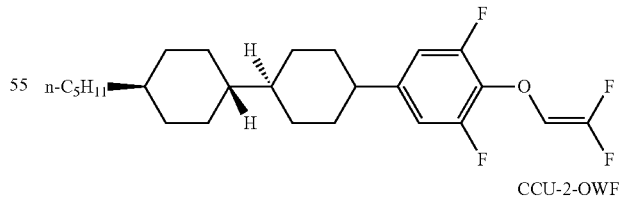

-continued

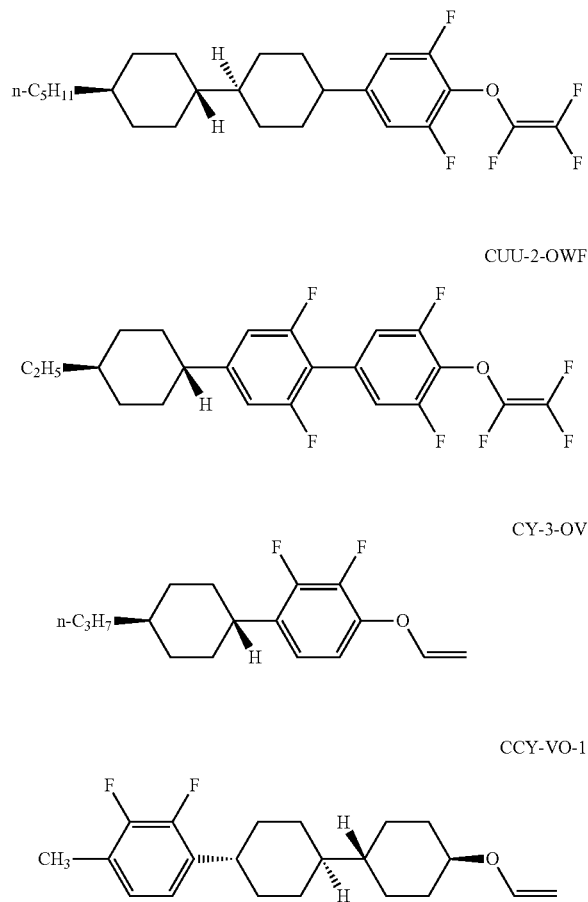

Initiators (Curing Agents)

Unless noted otherwise, the "UV curing agent" employed is a photoinitiator having the following specification:

triarylsulfonium hexafluoroantimonate salts, 50% by weight in propylene carbonate, Aldrich No. 654027.

The active substance essentially consists of the salt $[Ph_2S^+\text{-}Ph\text{-}S\text{-}Ph\text{-}S^+Ph_2][SbF_6^-]_2$ The amount indicated relates to the diluted solution. The actual amount by weight of initiator is 50%.

Degacure™ K185 (Degussa), bis[4-(diphenylsulfonio) phenyl]sulfide bishexafluorophosphate, corresponds in its structure to the sulfonium curing agent mentioned above, but contains the hexafluorophosphate anion as counterion instead of the antimonate and is therefore less toxic with virtually the same efficiency as the antimonate derivative. It is therefore suitable as photoinitiator for the production of toxicologically acceptable food packaging based on polymers of 3,4-epoxy-cyclohexylmethyl 3,4-epoxycyclohexanecarboxylate (Degacure™ K128=Uvacure™ 1500) and is preferred to the antimonate on use on a production scale.

Reference is furthermore made by way of example to the curing agent Oman071™, which, although it can cause a greyish colouration, is compatible with the OLED cathodes. It is also suitable for consecutive curing. Oman071™ (ABCR): p-(octyloxyphenyl)phenyliodonium hexafluoroantimonate.

Additives Analogous to Formula Ib According to the Invention are, for example, the cyclic hydrocarbons CC-3-V1 and CC-3-V:

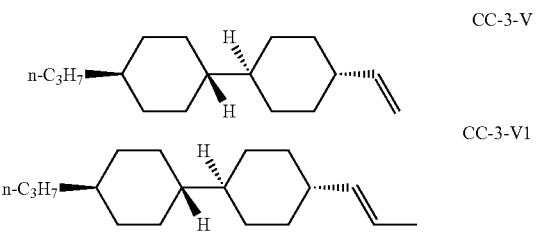

Monomeric hydrocarbons (for example squalene) or polymeric hydrocarbons, such as polybutadiene or poly-alpha-pinene, can also be added to vinyl ether mixtures comprising proportions of the compounds Ia.

N-Propylmaleimide (MPr)

From the series of the commercial maleimides, the N-alkylmaleimides are suitable representatives which dissolve in the relatively small, stoichiometrically necessary amounts of vinyl ethers that are necessary for a photoinitiator-free polymerisation. Particularly good solubility has been noted with N-propylmaleimide in vinyl ether D. The curing times are in the range 1-2 minutes.

Determination of the Adhesion by Means of a Manual Test:

Two glass plates, either soda-lime or borosilicate glass, 50×50 mm, thickness 0.7 and 0.7 mm, are bonded to one another offset in such a way that an approximately 10 mm projection arises on the offset side. There is only one glass plate on the projection. The glass plates can be loaded by flexing with two hands by means of the projection. If it is not possible to break the plates apart by manual flexing, the curing is assessed as positive. Separation by manual loading occurs since the curing is not sufficient or the bond reacts in a brittle manner if the adhesion is not sufficient. The bond between the adhesive and the glass then separates. The adhesive layers in this test are between 0.1 and 0.3 millimeters, depending on the viscosity.

Irradiation

An Hg medium-pressure lamp having a power of 85 mW/cm² is used. It has a UV radiation between 275 and 450 nm and lower proportions in the visible region (cf. FIG. 1).

Mixture Examples in General

The percentage data relate to percent by weight, unless indicated otherwise. The examples indicated comprise no further solid fillers apart from the % proportions indicated.

Mixture Examples of Vinyl Ether-Based, Lipophilic Compositions

The following compositions (Examples 1 to 5) form a strong bond in the hand test. Component CC-3-V1 is not polymerised. The exposure time is about 5 to 30 s at about 85 mwatt/cm².

Example 1

| Component | Proportion by weight [%] |
| --- | --- |
| D: 4-(Vinyloxymethyl)cyclohexylmethyl benzoate | ~88 |
| CC-3-V1 | 10 |
| C | 2 |
| Triarylsulfonium hexafluoroantimonate salt | 0.1 to 0.2 |

The composition exhibits good wetting on soda-lime glass, good curing and strength. The cathode compatibility is good.

Example 2

| Component | Proportion by weight [%] |
| --- | --- |
| D: 4-(Vinyloxymethyl)cyclohexylmethyl benzoate | ~83 |
| CC-3-V1 | 10 |
| C | 2 |
| F | 5 |
| Triarylsulfonium hexafluoroantimonate salt | 0.1 |

The composition exhibits good wetting on soda-lime glass, good curing and strength. The cathode compatibility is good.

Example 3

| Component | Proportion by weight [%] |
| --- | --- |
| D: 4-(Vinyloxymethyl)cyclohexylmethyl benzoate | ~80-88 |
| CC-3-V1 | 10 |
| F | 2-10 |
| Triarylsulfonium hexafluoroantimonate salt | 0.05 |

The composition exhibits good wetting on soda-lime glass, good curing and strength. The cathode compatibility is good.

Example 4

| Component | Proportion by weight [%] |
| --- | --- |
| D: 4-(Vinyloxymethyl)cyclohexylmethyl benzoate | ~80 |
| CC-3-V1 | 10 |
| I | 10 |
| Triarylsulfonium hexafluoroantimonate salt | 0.05 |

The composition exhibits good wetting on soda-lime glass, good curing and strength. The cathode compatibility is good.

Example 5

| Component | Proportion by weight [%] |
| --- | --- |
| D: 4-(Vinyloxymethyl)cyclohexylmethyl benzoate | 88 |
| CC-5-1OV | 10 |
| C | 1 |
| Triarylsulfonium hexafluoroantimonate salt | 1 |

The composition exhibits good wetting on soda-lime glass, good curing and strength. The cathode compatibility is good.

Example 6

| Component | Proportion by weight [%] |
| --- | --- |
| D: 4-(Vinyloxymethyl)cyclohexylmethyl benzoate | 88 |
| Spirovinyl ether | 10 |
| C | 1 |
| Triarylsulfonium hexafluoroantimonate salt | 1 |

The composition exhibits good wetting on soda-lime glass, good curing and strength. The cathode compatibility is good.

Example 7

| Component | Proportion by weight [%] |
| --- | --- |
| D: 4-(Vinyloxymethyl)cyclohexylmethyl benzoate | ~88 |
| CCU-3-OXF or CCU-5-OXF | 10 |
| C | 2 |
| Triarylsulfonium hexafluoroantimonate salt | 0.025 |

The composition exhibits good wetting on soda-lime glass, good curing and strength. The cathode compatibility is good. This experiment shows adequate curing with as little curing agent as possible.

Example 8

| Component | Proportion by weight [%] |
| --- | --- |
| D: 4-(Vinyloxymethyl)cyclohexylmethyl benzoate | 86 |
| CUU-2-OWF | 10 |
| C | 4 |
| Triarylsulfonium hexafluoroantimonate salt | 0.2 |

The composition exhibits good wetting on soda-lime glass, good curing and strength. The cathode compatibility is good. This experiment shows adequate curing with as little curing agent as possible.

Example 9

Silane Additive as Getter for Binding Ingressing Water

| Component | Proportion by weight [%] |
| --- | --- |
| D | 83 |
| I | 5 |
| CC-3-V1 | 5 |
| 2,4,6,8-Tetramethyl-2,4,6,8-tetravinylcyclotetra-siloxane | 5 |
| Triarylsulfonium hexafluoroantimonate salt | 2 |

The composition also exhibits good curing and adhesion with addition of silane.

Mixtures with Maleimide (MPr)

The mixtures are exposed for 1-2 min using the UV lamp indicated.

Example 10

| Component | Proportion by weight [%] |
| --- | --- |
| D: 4-(Vinyloxymethyl)cyclohexylmethyl benzoate (purified) | 30.25 |
| CCU-3-OXF or CCU-5-OXF | 34.5 |
| MPr (purified) | 35.25 |

The composition is readily curable without initiator.

Example 11

| Component | Proportion by weight [%] |
| --- | --- |
| D: 4-(Vinyloxymethyl)cyclohexylmethyl benzoate (purified) | 30.0 |
| CC-5-1OV | 30.0 |
| MPr (purified) | 39.0 |
| C | 1.0 |

The composition is readily curable without initiator.

Determination of the Cathode Compatibility on OLED Components:

The monomeric adhesive composition is not degassed and is mixed without a protective gas, then introduced into the glovebox, applied to the OLED cathode in a thickness of about 0.5 mm, and no cover glass is pressed on. After curing, the OLEDs are addressed electrically and under a protective gas, and their luminous image is assessed with respect to any cathode damage. The content of photoinitiators was intentionally selected to be high in order to demonstrate compatibility with the cathodes.

The cathodes used were of the lithium fluoride under aluminum type.

Reliably good results are obtained after purification of material "D" and the N-propylmaleimide. Material D is purified by chromatography by filtration through silica gel with a suitable organic solvent. The maleimide MPr is purified by distillation in vacuo.

The examples indicated below all exhibit good wettability on the cathode and on soda-lime glass.

The quality of the OLED arrangement is compared with the untreated arrangement after application of the adhesive composition, after polymerisation and after luminous operation for 72 h. The light output of the OLED arrangement is in each case tested with respect to brightness and the occurrence of faulty, dark areas.

Cathodes which appear undamaged according to the luminous image are obtained with the following compositions:

Example 12

| Component | Proportion by weight [%] |
| --- | --- |
| D: 4-(Vinyloxymethyl)cyclohexylmethyl benzoate | ~88 |
| CC-3-V1 | 10 |
| C | 4 |
| Triarylsulfonium hexafluoroantimonate salt | 0.2 |

Example 13

| Component | Proportion by weight [%] |
| --- | --- |
| D: 4-(Vinyloxymethyl)cyclohexylmethyl benzoate | ~85 |
| CC-3-V1 | 10 |
| F | 5 |
| Triarylsulfonium hexafluoroantimonate salt | 0.2 |

Example 14

| Component | Proportion by weight [%] |
| --- | --- |
| D: 4-(Vinyloxymethyl)cyclohexylmethyl benzoate | ~82 |
| CC-3-V1 | 5 |
| I | 10 |
| F | 3 |
| Triarylsulfonium hexafluoroantimonate salt | 0.2 |

Example 15

| Component | Proportion by weight [%] |
| --- | --- |
| D: 4-(Vinyloxymethyl)cyclohexylmethyl benzoate (purified) | ~85 |
| CC-3-V1 | 5 |
| I | 5 |
| Methyl-2,4,6,8-tetravinylcyclotetrasilane | 5 |
| Triarylsulfonium hexafluoroantimonate salt | 0.2 |

Example 16

| Component | Proportion by weight [%] |
| --- | --- |
| D: 4-(Vinyloxymethyl)cyclohexylmethyl benzoate (purified) | ~80 |
| CCU-5-OXF | 10 |
| I | 10 |
| Triarylsulfonium hexafluoroantimonate salt | 0.2 |

Example 17

| Component | Proportion by weight [%] |
| --- | --- |
| D: 4-(Vinyloxymethyl)cyclohexylmethyl benzoate (purified) | ~75 |
| CC-5-1OV | 10 |
| I | 10 |
| F | 5 |
| Triarylsulfonium hexafluoroantimonate salt | 0.2 |

Examples of Consecutive Curing

The procedure is carried out analogously to Example 1, with the exposure being only 5 seconds. The exposure was selected in such a way that noticeable, but incomplete curing is observed immediately after the exposure. Attention was directed to the fact that the samples excited with UV light have the ability to cure fully subsequently. Furthermore, a curing time with UV light of at least 5 seconds was aimed at for fuller curing. Shorter curing times were accepted as difficult to complete. Optimisation with respect to processing, hardness and adhesion is still possible, depending on the requirements.

Example 18

| Component | Proportion by weight [%] |
| --- | --- |
| D: 4-(Vinyloxymethyl)cyclohexylmethyl benzoate (purified) | ~79 |
| CC-5-1OV | 10 |
| F | 10 |
| p-(Octyloxyphenyl)phenyliodonium hexafluoroantimonate | 1 |

The sample was initially cured with UV for 5 seconds and then cured in a further curing step for one hour on a hotplate at 80° C.

Example 19

| Component | Proportion by weight [%] |
| --- | --- |
| D: 4-(Vinyloxymethyl)cyclohexylmethyl benzoate (purified) | 46.5 |
| Diglycidyl ether of bisphenol "F" | 46.5 |
| CC-5-1OV | 6 |
| Triarylsulfonium hexafluoroantimonate salt | 1 |

The sample was initially cured with UV for 5 seconds and then cured in a further curing step for one hour on a hotplate at 80° C.

Example 20

| Component | Proportion by weight [%] |
| --- | --- |
| D: 4-(vinyloxymethyl)cyclohexylmethyl benzoate (purified) | 44 |
| F | 5 |
| Diglycidyl ether of bisphenol "F" | 44 |
| CUU-2-OWF | 6 |
| Triarylsulfonium hexafluoroantimonate salt | 1 |

The sample was initially cured with UV for 5 seconds and then cured in a further curing step for one hour on a hotplate at 80° C.

Example 21

| Component | Proportion by weight [%] |
| --- | --- |
| D: 4-(vinyloxymethyl)cyclohexylmethyl benzoate (purified) | 44 |
| I | 5 |
| Diglycidyl ether of bisphenol "F" | 44 |
| CUU-2-OWF | 6 |
| Triarylsulfonium hexafluoroantimonate salt | 1 |

The sample was initially cured with UV for 5 seconds and then cured in a further curing step for one hour on a hotplate at 80° C.

Example 22

| Component | Proportion by weight [%] |
| --- | --- |
| D: 4-(vinyloxymethyl)cyclohexylmethyl benzoate (purified) | 46.5 |
| Diglycidyl ether of bisphenol "F" | 46.5 |
| CCU-5-OWF | 6 |
| Triarylsulfonium hexafluoroantimonate salt | 1 |

The sample was initially cured with UV for 5 seconds and then cured in a further curing step for one hour on a hotplate at 80° C.

The invention claimed is:

1. Composition comprising:
   one or more vinyl ether monomers selected from the following compounds:

1,4-cyclohexanedimethanol divinyl ether (C)

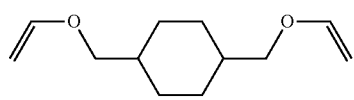

4-(vinyloxymethyl)cyclohexylmethyl benzoate (D)

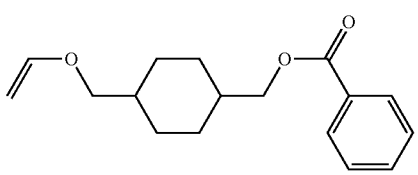

bis[4-(vinyloxy)butyl]isophthalate F
   bis[[4-[(vinyloxy)methyl]cyclohexyl]methyl]isophthalate I
   tris[4-(vinyloxy)butyl]trimellitate (NQV)

NQV

[Structure: benzene-1,2,4-tricarboxylic acid tris(4-(vinyloxy)butyl) ester]

and a further component selected from a) or b):

a) the vinyl ether or fluorovinyl ether compounds of the formula Ia $$(R^1)_{n1} \left[ \begin{array}{c} (X)_{p1} \\ A^1 \end{array} - Z^1 \right] \left[ \begin{array}{c} (R^2)_{n2} (X)_{p2} \\ A^2 \end{array} - Z^2 \right]_{m2} \left[ \begin{array}{c} (R^3)_{n3} \\ A^3 \end{array} \right]_{m3} (X)_{p3} \quad \text{Ia}$$

in which $m^1$, $m^2$, $m^3$ denote 0, 1 or 2, where $m^2+m^2+m^3=2$ to 6;

$R^1$, $R^2$, $R^3$, independently of one another, denote H, a fluorinated or unsubstituted, straight-chain or branched alkyl radical having 1 to 15 C atoms, where, in addition, one or more non-terminal $CH_2$ groups in these radicals may each be replaced, independently of one another, by —CH=CH—, —(CO)—, —O— or —S— in such a way that O or S atoms are not linked directly to one another, F or Cl;

p1, p3, n1, n3 denote 0, 1, 2, 3, 4 or 5, where p1+n1=0 to 5 and p3+n3=0 to 5;

p2, n2 denote 0, 1, 2, 3, or 4, where p2+n2=0 to 4;

where p1+p2+p3≥1;

X denotes Q-O—CH=$CH_2$, Q-O—CH=$CF_2$ or Q-O—CF=$CF_2$;

Q denotes a single bond or —$CH_2$— or a $C_2$-$C_{10}$ alkylene radical, in which one or more $CH_2$ groups in this alkylene radical may be replaced by —O— or —S— in such a way that 0 atoms are not adjacent;

$A^1$, $A^2$, $A^3$ each, independently of one another, denote a 1,2-, 1,3- or 1,4-cyclohexylene group, a 1,2-, 1,3- or 1,4-cyclohexenylene group, a 1,2-, 1,3- or 1,4-phenylene group, in each of which $CH_2$ may be replaced by O or in each of which =CH— may be replaced by =N—, or a spiro[3.3]heptane-2,6-diyl group, $Z^1$, $Z^2$ each, independently of one another, denote a single bond, —$CH_2CH_2$—, an alkylene group having 3 to 6 C atoms, —$CF_2CF_2$—, —$CH_2O$—, —$CF_2O$—, —$OCF_2$—, or —C≡C—;

where, in the case where X represents a group of the formula —OCH=$CH_2$ and $A^1$, $A^2$ or $A^3$ is bonded to a phenylene group, the respective group $A^1$ in the ortho position to X is not substituted by hydrogen;

or b) a compound of the formula Ib $$R^4 - A^4 - Z^4 - A^5 - R^5 \quad \text{Ib}$$

in which $R^4$, $R^5$, independently of one another, denote a $C_1$-$C_{10}$ alkyl, in which one or more $CH_2$ groups may be replaced by the group —CH=CH—, or in which H may be replaced by F, $A^4$, $A^5$ denote a 1,2-, 1,3- or 1,4-cyclohexylene group, a 1,2-, 1,3- or 1,4-cyclohexenylene group or a 1,2-, 1,3- or 1,4-phenylene group, and $Z^4$ denotes a single bond, —$(CH_2)_r$—, —CH=CH—, —C≡C—, —$CF_2$—$CF_2$— or —$CF_2O$—, where r=1-6, where the total content of vinyl ethers and fluorovinyl ethers together is at least 50% by weight.

2. Composition according to claim 1, where the total content of vinyl ethers and fluorovinyl ethers together is at least 70% by weight.

3. Composition according to claim 1, which comprises up to 25% by weight of one or more vinyl ether or fluorovinyl ether compounds of the formula Ia.

4. Composition according to claim 1, which comprises 3 to 25% by weight of one or more vinyl ether or fluorovinyl ether compounds of the formula Ia.

5. Composition according to claim 1, which comprises up to 25% by weight of one or more compounds of the formula Ib.

6. Composition according to claim 1, which comprises 3 to 25% by weight of one or more compounds of the formula Ib.

7. Composition according to claim 1, which furthermore comprises up to 50% by weight of a polymerisable epoxide.

8. Composition according to claim 1, which furthermore comprises an initiator for cationic polymerisation.

9. Composition according to claim 1, which comprises up to 45% by weight of a difluoro- and/or trifluorovinyl ether.

10. Composition according to claim 1, which furthermore comprises up to 40% by weight of a maleimide.

11. Composition according to claim 1, which furthermore comprises an additive for influencing the viscosity, thixotropy and/or surface tension.

12. Composition according to claim 1, which is cured by polymerisation.

13. A method for adhering, coating or sealing an opto-electronic component which comprises applying a composition according to claim 1 to an opto-electronic component.

14. Process for the production of an opto-electronic device consisting of a plurality of layers, where these layers include a two-dimensional substrate and a cover layer, comprising:

i) applying a composition to the substrate and/or the cover layer, where the composition is a composition according to claim 1, and optionally conducting a first curing, ii) joining of the two-dimensional substrate and the cover layer in such a way that the composition is located in between, and iii) conducting full curing of the composition.

15. Process according to claim 14, wherein the full curing in step iii) is carried out by irradiation of the composition through a cover layer which is transparent and/or by thermal treatment of the device.

* * * * *